Patented Mar. 12, 1935

1,994,002

UNITED STATES PATENT OFFICE 1,994,002

ZINC 2.4.5-TRICHLOROPHENOLATE

Lindley E. Mills, Midland, Mich., assignor to The Dow Chemical Company, Midland, Mich., a corporation of Michigan No Drawing. Original application May 2, 1932, Serial No. 608,855. Divided and this application October 9, 1934, Serial No. 747,611

1 Claim. (Cl. 260—11)

The present invention has for its object a new compound, namely, zinc 2.4.5-trichlorophenolate.

I have prepared the aforementioned compound, determined certain physical properties thereof whereby it may readily be identified, and have discovered that it may advantageously be used as a fungicide, antiseptic, preservative, etc.

The method which I generally employ for the preparation of an aforementioned phenolate comprises effecting in aqueous solution a double decomposition of a soluble salt of zinc with an alkali metal 2.4.5-trichlorophenolate.

In carrying out the foregoing method for the preparation of zinc 2.4.5-trichlorophenolate the compound is obtained directly by precipitation, in a hydrated form as the mono-hydrate. The mono-hydrate may readily be dehydrated to the anhydrous compound, as by heating to a temperature between 40° and 60° C. at atmospheric pressure or by drying in vacuo over sulphuric acid or calcium chloride at room temperature. The compound is a white crystalline substance which does not melt but decomposes upon heating. It is only very slightly soluble in cold water, somewhat more soluble in hot water, and in aqueous solution is partially decomposed by carbon dioxide with the formation of zinc carbonate and trichlorophenol.

The structural formula of zinc 2.4.5-trichlorophenolate is

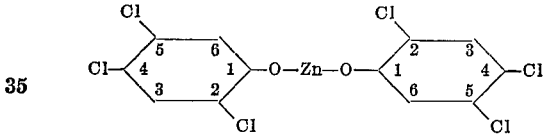

The following example illustrates the method which I have followed for the preparation of the compound.

*Example 1.*—Zinc 2.4.5-trichlorophenolate.

I dissolved 13.6 grams (0.1 mol) of zinc chloride in 200 grams of water and poured this solution into another solution formed by dissolving 39.5 grams (0.2 mol) of 2.4.5-trichlorophenol and 8 grams (0.2 mol) of sodium hydroxide in 600 grams of water at ordinary temperature. The reaction mixture was agitated during the mixing of the two solutions and stirring was continued for about 30 minutes thereafter. It was then filtered and the precipitate dried in vacuo over sulphuric acid. The yield of anhydrous zinc 2.4.5-trichlorophenolate was 41 grams or 90 per cent of that theoretically obtainable.

Upon analysis the theoretical percentage of zinc was found in the foregoing phenolate, and the correct amount of 2.4.5-trichlorophenol was obtained by acidifying some of the phenolate and boiling the acid solution.

Aqueous solutions of zinc 2.4.5-trichlorophenolate may be more advantageously used as fungicides, etc. than free trichlorophenol, partially because of their greater solubility in water as compared with the free phenol and partially because they have less foliage-burning effect.

This application is a division of United States patent application Serial Number 608,855.

Other modes of applying the principle of my invention may be employed instead of the one explained, change being made as regards the compound herein disclosed, provided the step or steps stated by any of the following claims or the equivalent of such stated step or steps be employed.

I therefore particularly point out and distinctly claim as my invention:—

Zinc 2.4.5-trichlorophenolate.

LINDLEY E. MILLS.